Oct. 4, 1949.     M. A. SEGURA ET AL     2,483,850
PROCESS OF RECLAIMING A CONTAMINATED IRON CATALYST
Filed July 23, 1947
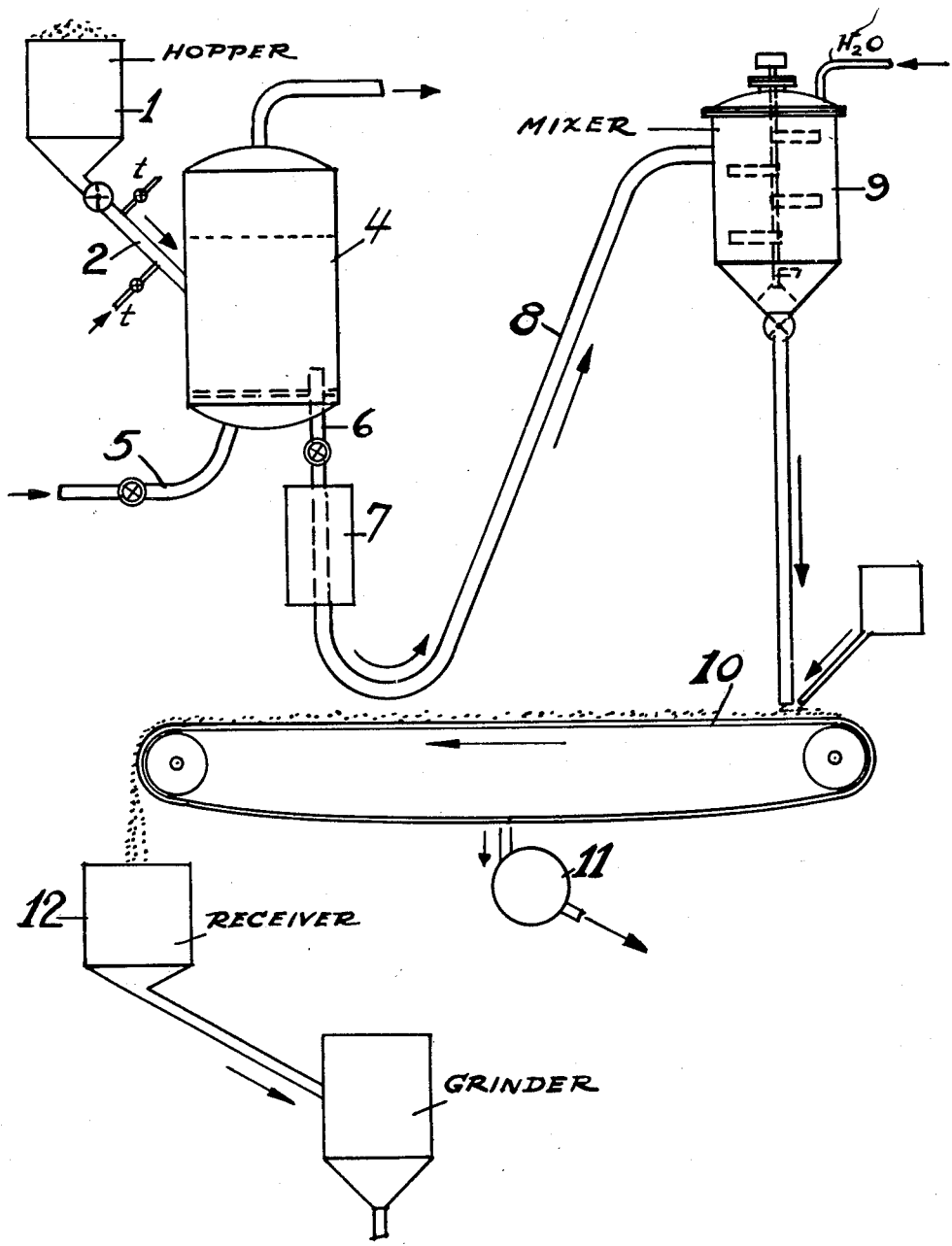

Patented Oct. 4, 1949

2,483,850

UNITED STATES PATENT OFFICE 2,483,850

PROCESS OF RECLAIMING A CONTAMINATED IRON CATALYST

Marnell A. Segura and Don R. McAdams, Baton Rouge, La., assignors to Standard Oil Development Company, a corporation of Delaware Application July 23, 1947, Serial No. 763,106

4 Claims. (Cl. 252—417)

Our present invention relates to improvements in the reworking of contaminated catalysts active for synthesizing hydrocarbons and oxygenated hydrocarbons from gaseous mixtures containing carbon oxides, such as the monoxide, and free hydrogen, or hydrogen combined in the form of water. In particular, our invention relates to the reclamation of iron catalysts, previously used to promote the foregoing synthesis, to recover said catalysts in an active and usable condition.

Heretofore, and prior to our present invention, others had produced hydrocarbons by reacting together carbon monoxide and hydrogen. It is our belief and understanding that the earliest work in this field on a commercial scale was done in countries foreign to the United States. The literature contains disclosures of process for forming normally liquid hydrocarbons by the reduction of carbon monoxide with hydrogen in the presence of cobalt, usually supported and promoted. It also contains disclosures of hydrocarbon synthesis processes in which iron, usually promoted, is used as the active catalytic component.

Insofar as we are aware, the earliest experimental and commercial processes in this hydrocarbon synthesis field, were performed in cases or reactors containing a stationary bed, or several such beds, of the catalyst, the catalyst itself being in the form of pills, pellets, granules, lumps, shaped bodies, in short, of aggregates of appreciable size. The reactants containing carbon monoxide and hydrogen, and sometimes also added water (vapor or steam), and/or carbon dioxide, were forced into contact with the catalyst in a reaction zone which was maintained under reaction conditions of temperature and pressure.

In the process employing cobalt as the catalyst, the temperatures employed were of the order of say about 350–450° F. The catalyst consisted essentially of a major portion of kieselguhr, which was the conventional support, a minor quantity of the cobalt, in metallic form, and a small amount of a promoter such as thoria. The pressure employed during the process was approximately atmospheric although somewhat elevated pressures were often employed. This process, employing the cobalt catalyst, was characterized by the fact that the product was straight chain paraffinic, primarily. That is to say the product contained normally gaseous paraffin, normally liquid paraffin, and paraffin wax, the said paraffins being normal. Therefore, the gasoline fraction of such product was of very poor anti-detonation quality and hence required careful after-treatment, as by reforming to produce a good quality gasoline.

The process employing iron as the catalyst was operated at somewhat higher temperatures than the above cobalt-using process, namely, temperatures of the order of from say 475–675–700° F. It was also found desirable to operate this latter process at higher pressures than the pressures used where the catalyst was cobalt. For example, pressures up to 400–500 p. s. i. g. were found to give good results in this iron-using process. It should also be pointed out that, whereas in the process employing the cobalt catalyst, the ratio of $H_2/CO$ in the feed was of the order of 2 mols of hydrogen per mol of carbon monoxide, the ratio of $H_2/CO$ in the process employing iron as the catalyst was of the general order of 1 mol of hydrogen to 1 mol of carbon monoxide. In view of the lower hydrogen to carbon monoxide ratio, the synthetic gasoline formed in the iron-using process, contained substantial quantities of olefinic hydrocarbons, and hence possessed superior anti-detonation quality.

The next step in the development of the hydrocarbon synthesis was an attempt to employ the so-called fluid catalyst technique. As is generally known, this technique involves forming in a reaction zone, a dense, turbulent, ebullient suspension of powdered catalyst in the gasiform reactants. Broadly speaking this technique had been previously employed on a commercial scale in other fields, such as, for example, in the catalytic cracking of gas oil. It was soon discovered, however, that in attempting to utilize the fluid catalyst technique in the hydrocarbon synthesis process, difficulties were encountered which were not previously met in the older process, including catalytic cracking of gas oil. For example, in the attempt to employ the iron catalyst in powdered form in the hydrocarbon synthesis operation, it was found that the reaction resulted in the deposition of carbonaceous material on the iron catalyst, which deposits apparently penetrated into the interior of the catalyst, causing a serious weakening of its tensile strength. This phenomenon resulted in the physical disintegration of the catalyst in use, thus forming copious quantities of fines which could not be successfully formed into the dense suspension previously referred to, or, as the technicians say, could not be "fluidized." It has been established by experimental proof that a well fluidized iron catalyst must be one which contains a major portion of powdered iron having a particle size in excess of at least about 30 microns on a carbon free basis. In other words a catalyst which can be readily fluidized is one which has approximately the following particle size distribution:

| | Per cent by weight |
|---|---|
| 0–20 microns | 20 |
| 20–40 microns | 20 |
| 40–60 microns | 40 |
| 60–80 microns | 10 |
| 80–200 microns | 10 |

It will be understood, of course, that in forming the fluidized bed of catalyst, the same is accomplished by causing the reactants and other gasiform materials in the reaction zone to flow upwardly therein in contact with a mass of catalyst, at a rate of from about 0.25 to 2.0 feet per second, the same being velocity superficial, that is to say, considered as though the reactor contained no catalyst. Sufficient catalyst is present in the reactor to form under the gas flow conditions stated, a suspension weighing from 12 to 80 lbs., per cu. ft.

Having thus summarized, briefly, the prior knowledge relating to synthetic production of hydrocarbons employing the oxides of carbon and hydrogen in some form as starting materials, our present invention relates to the specific improvements hereinafter fully disclosed in the specification, the accompanying drawing and the appended claims.

The main object of our present invention relates to improvements in reclaiming a used iron catalyst which has become contaminated with carbon in the hydrocarbon synthesis process and which, as a result of such use, has been reduced to a particle size such that it can not be satisfactorily fluidized.

In the accompanying drawing, we have shown diagrammatically a form and arrangement of apparatus elements in which a preferred embodiment of our invention may be carried into practical effect.

Referring in detail to the drawing, 1 represents a storage vessel for powdered iron catalyst contaminated with carbonaceous material. The powdered material is withdrawn through a standpipe 2 controlled by a valve 3 and discharged into a burner 4 where it is treated with air or other oxygen-containing gas discharged into the bottom of the burner through line 5. The catalyst undergoing burning of the carbonaceous material is in the form of a dense, turbulent, ebullient suspension effected by regulating the superficial velocity of the air within the limits of from ½ to 3 feet per second. Care is taken to prevent the catalyst from acquiring a temperature in excess of, say, 1100° F. and it is permitted to remain resident in the burning zone for a sufficient period of time merely to burn off a portion of the carbonaceous material. The catalyst still containing carbonaceous material is withdrawn through a pipe 6, cooled in a cooler 7, and then conveyed by any suitable means 8, such as a Redler conveyor or pneumatically, to a mixer 9. In mixer 9, it is admixed with water preferably containing dissolved therein a promoter such as potassium fluoride, potassium hydroxide, potassium oxide, sodium oxide, or even an alkaline earth metal oxide or compound, the amount of promoter being such that it will constitute from 1 to 3 weight per cent of the iron in the final catalyst composition. The amount of water mixed with the catalyst is around 20 weight per cent, say 18 to 23 per cent, and the catalyst contains from 10 to 30% carbonaceous deposits by weight based on the iron catalyst. Experience has shown that if the catalyst contains more than 30% carbonaceous deposits it cannot be satisfactorily wetted with water in order to form the cohesive bed necessary for the sintering process we are about to describe. The catalyst, before mixing, should, of course, be cooled to around room temperature or at least below the boiling point of water.

The wetted catalyst is withdrawn from the mixer 9 through line 10 and discharged onto a sintering machine which consists essentially, in the preferred modification, of a continuous moving grate 11. A moving screen may also be employed. It is sometimes necessary, in order to prevent the iron from passing through the screen or grate, to mix rather large lumps of carbon-free iron with the spent iron fines preferably by placing them on the moving grate 11. However, when mixed with about 20 weight per cent of water, the powdered iron itself has sufficient cohesiveness to form a loosely compacted mass, and under pressure it may be compacted or formed into a ball in much the same manner as one would form a snowball with his hands.

In performing the sintering operation, a stream of air or other oxygen-containing gas is drawn through the bed from the top downwardly by means of a suction pump 12. In order to initiate combustion, the surface of the moist mass on the screen may be contacted with a torch or other flame. The burning of the carbonaceous material associated with the iron causes the particles of iron to be sintered, that is, to be subjected to a temperature of incipient fusion which causes the fine particles to agglomerate, forming relatively large aggregates or lumps. During the burning, the carbon on the catalyst is consumed. The burning of the carbon, once ignited, is self-sustaining. The process is called "sintering" because it occurs at temperatures below the true melting point of the iron and because during the process the particles agglomerate or coalesce. In order to aid the sintering process, the bed of iron on the screen or grate 11 should be fairly loosely compacted, so as to permit the oxygen-containing gas to flow through the same readily. During the sintering operation, the temperature of at least a portion of the iron mass is from about 2000° to 2300° F. The operation should be conducted rather rapidly so that the average time of the catalyst at the temperature level referred to is merely a matter of a few minutes. The sintered catalyst is discharged from the grate 11 into a quenching zone 13 where it is contacted with water or other cooling material. Following quenching and, after separation from the water or cooling medium, the iron is subjected to regrinding to give a particle size within the ranges hereinbefore mentioned, whereupon it is ready for reuse in the hydrocarbon synthesis process.

In order to test the activity of our catalyst sintered according to the foregoing method, therefore, we tested the activity of the catalyst in a hydrocarbon synthesis process. The catalyst tested had been previously used in a hydrocarbon synthesis process and contained 37.8 weight per cent carbon and had the approximate particle size distribution:

| | Per cent by weight |
|---|---|
| 0–20 microns | 86 |
| 20–40 microns | 9 |
| 40 and larger microns | 5 |

The carbon content of this catalyst was lowered by burning the catalyst to consume partially carbonaceous material. In other words, the catalyst after burning contained about 13% of carbonaceous material. 82 parts of the partially burned catalyst were mixed with 18 parts of water and subjected to sintering in an apparatus similar to that shown. Following sintering, the catalyst was quenched and ground and tested for activity, after reducing the catalyst with a hydrogen-containing gas in the usual manner, by causing a synthesis gas containing 1 mol of hydrogen per mol of carbon monoxide to contact the reclaimed catalyst at a temperature of 600° F. while maintaining a pressure of 300 pounds per square inch absolute and while feeding the synthesis gas into contact with the catalyst at a feed rate of 200 volumes of standard conditions synthesis gas, per volume of catalyst, per hour. At the end of the test, the product was collected, and it was found that 198 cc. of $C_{4+}$ hydrocarbons per cubic meter of hydrogen and carbon monoxide consumed, were formed. Since yields in the neighborhood of 200 cc. of $C_{4+}$ hydrocarbons per cubic meter of carbon monoxide and hydrogen, measured of course at standard conditions of temperature and pressure, are considered good yields in the hydrocarbon synthesis process, it is clear from our test that the sintered catalyst possessed high activity.

Our present invention relates in particular to a method of reclaiming used iron catalysts which have become contaminated with carbonaceous deposits to the extent that they contain 45 to 70 weight per cent carbonaceous material and which are further characterized that, due to the carbonaceous contaminants, the powdered iron catalysts are reduced to fines which are not readily adapted to be procured in fluidized condition in a reactor.

If the iron catalyst fines are contaminated with a large quantity of carbonaceous material it is difficult or impossible to wet the iron particles so that they may be handled on a device such as that shown on the attached drawing. In other words, water is necessary in forming with the contaminated catalyst fines a mass which can be spread into a layer several inches thick on the moving screen shown on the drawing. The amount of water mixed with the catalyst should not be enough to form a slurry, or even a mud. Rather it should be a quantity say from 15 to 25 weight per cent of the iron catalyst, that will render the mass loosely coherent, yet porous. Roughly the mass fed onto the moving screen shown in the drawing has a moisture content sensible to touch approximating that of fresh, moist loam, and also resembling the said loam in cohesion.

However, as stated, if the iron carried a large percentage of contaminated carbonaceous material it is difficult to wet the same with water. We propose to correct this insufficiency by burning off a portion of the carbonaceous deposits, thereby reducing the carbon content to a degree whereby it may be readily wetted with sufficient water for good sintering. To explain this matter further, it should be pointed out that if the catalyst contains 5 to 10 or even up to 30 weight per cent carbonaceous deposits, we have found that it may be readily wetted with about 20% water. When the catalyst has been reduced in carbonaceous content to say 5 to 25 weight per cent, we then subject the catalyst to sintering after having first wetted the same with the proper amount of water.

With respect to the sintering operation, as we have previously stated, a bed of moistened iron 5 or 6 inches thick is formed on the moving grate and it has sufficient cohesiveness to remain on top of the foraminous member. The material contacts a flame as it is deposited at the feed end of the grate, which causes the upper surface to be heated to incandescence. The material then moves toward the discharge end of the grate and the effect of the air or oxygen-containing gas being drawn through the bed is to cause fuel, that is, the carbonaceous material, to be burned. As the flame front proceeds downwardly, the upper surface becomes cooler and, although the material is resident on the grate for an average time of five minutes, it is exposed to temperatures of the order of 2000° F. for a period of time varying from ½ to 2 minutes. The sintered material is a friable mass which may be broken into lumps and, as previously stated, ground to the desired particle size. Chemically, the iron recovered from the sintering operation is in the form of the oxide. During the burning and sintering process, the catalyst retains its surface and activity as evidenced by the many tests we made in hydrocarbon synthesis runs.

Numerous modifications of our invention may be made by those who are familiar with this art without departing from the spirit thereof.

We claim:

1. The method of reclaiming an iron catalyst contaminated with carbonaceous material which comprises burning said contaminant at a temperature of about 1000° to 1150° F. to remove carbonaceous contaminant to the extent that the thus treated catalyst does not contain more than about 30 nor less than about 5 weight percent carbonaceous material, cooling the treated catalyst to a temperature below the boiling point of water, mixing with water in sufficient quantity to form a moist loosely compacted mass, exposing said mass to sintering temperatures of about 2000° to 2200° F. for about ½ to 2 minutes, quenching, and re-grinding the sintered product.

2. The method of claim 1 in which a promoter adapted to promote the catalytic conversion of CO and $H_2$ to valuable liquid hydrocarbons and selected from the class consisting of alkali and alkaline earth metal compounds is dissolved in the water mixed with the iron catalyst prior to the sintering step.

3. The method of claim 1 in which the carbonaceous materials in the iron are reduced in quantity by burning so they constitute from about 10 to 15 weight per cent of the catalyst.

4. The method of reclaiming powdered iron catalyst which has become contaminated with carbonaceous solids during a hydrocarbon synthesis operation, which carbonaceous deposits tend to cause fragmentation of said iron catalyst and which contaminants are present on the catalyst to the extent that it can not be wetted by water, which comprises first treating the contaminated catalyst with an oxygen-containing gas at an elevated temperature for a sufficient period of time, to reduce by combustion thereof, the carbonaceous content of the catalyst to 5–30% by weight of the total catalyst, cooling the catalyst to a temperature below the boiling point of water, mixing the catalyst with 18 to 20 weight percent water to form a moist, loosely compacted mass, subjecting the said mass to sintering at a temperature within the range of from about 2000 to 2200° F. for about ½ to 2 minutes, and recovering the iron catalyst.

MARNELL A. SEGURA.
DON R. McADAMS.

REFERENCES CITED

The following references are of record in the file of this patent:

UNITED STATES PATENTS

| Number | Name | Date |
| --- | --- | --- |
| 2,183,146 | Michael | Dec. 12, 1939 |
| 2,220,261 | Michael | Nov. 5, 1940 |